(12) United States Patent
Monteil et al.

(10) Patent No.: US 11,665,184 B2
(45) Date of Patent: May 30, 2023

(54) DETECTING AND MITIGATING RISK IN A TRANSPORT NETWORK

(71) Applicant: INTERNATIONAL BUSINESS MACHINES CORPORATION, Armonk, NY (US)

(72) Inventors: Julien Monteil, Dublin (IE); Yassine Lassoued, Dublin (IE); Martin Mevissen, Dublin (IE); Anton Dekusar, Dublin (IE); Sergiy Zhuk, Dublin (IE); Rodrigo Ordonez-Hurtado, Maynooth (IE); Robert Shorten, Rathfarnham (IE); Wynita Griggs, Maynooth (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 534 days.

(21) Appl. No.: 16/250,632

(22) Filed: Jan. 17, 2019

(65) Prior Publication Data

US 2020/0236120 A1    Jul. 23, 2020

(51) Int. Cl.
*H04L 9/40* (2022.01)
*H04L 41/142* (2022.01)
*G06N 20/00* (2019.01)
*H04L 67/12* (2022.01)

(52) U.S. Cl.
CPC ......... *H04L 63/1425* (2013.01); *G06N 20/00* (2019.01); *H04L 41/142* (2013.01); *H04L 63/1416* (2013.01); *H04L 63/1441* (2013.01); *H04L 67/12* (2013.01)

(58) Field of Classification Search
CPC ............ H04L 63/1416; H04L 63/1425; H04L 63/1441; H04L 41/142; H04L 67/12; G06N 20/00
See application file for complete search history.

(56) References Cited

U.S. PATENT DOCUMENTS

| 8,274,377 | B2 | 9/2012 | Smith et al. |
| 8,738,280 | B2* | 5/2014 | Haran .................... G08G 1/168 455/418 |
| 8,966,631 | B2 | 2/2015 | El-Moussa |

(Continued)

OTHER PUBLICATIONS

Authors et al.: Disclosed Anonymously IPCOM000220073D, Determining Demographic Information Location Likelihood of Fraud and Interests Based On IP Address, User Agent and ISP Publication Date: Jul. 20, 2012 (5 Pages).

(Continued)

*Primary Examiner* — Thomas J Dailey
(74) *Attorney, Agent, or Firm* — Griffiths & Seaton PLLC (57) ABSTRACT

Embodiments for implementing intelligent risk detection and mitigation in a transport network by a processor. Data gathered from a plurality of data sources relating to an entity and a selected region of interest may be analyzed. Behavior of an entity, in relation to a risk event, may be learned and interpreted based on a plurality of identified contextual factors, geographical data, current data, historical data, a learned risk event model, or a combination thereof. One or more mitigation actions may be performed to mitigate risk of occurrence or a possible negative impact of the risk event caused at least in part by the behavior of the entity.

20 Claims, 7 Drawing Sheets

(56) References Cited

U.S. PATENT DOCUMENTS

| | | | |
|---|---|---|---|
| 9,258,319 | B1 | 2/2016 | Rubin |
| 9,258,321 | B2 * | 2/2016 | Amsler et al. |
| 10,002,536 | B2 * | 6/2018 | Kim .................. H04W 52/0229 |
| 10,911,494 | B2 * | 2/2021 | Giokas ................ H04L 63/1433 |
| 2011/0184617 | A1 * | 7/2011 | Hegemann ............ G01S 13/867 |
| | | | 701/70 |
| 2013/0154854 | A1 * | 6/2013 | Chen ....................... G08G 1/164 |
| | | | 340/905 |
| 2015/0350233 | A1 * | 12/2015 | Baxley ..................... G07C 9/22 |
| | | | 726/1 |
| 2017/0006135 | A1 * | 1/2017 | Siebel ..................... G06N 20/00 |
| 2018/0260815 | A1 * | 9/2018 | Bender .............. G06Q 20/3224 |
| 2019/0124115 | A1 * | 4/2019 | Chris ....................... H04L 67/22 |
| 2019/0197442 | A1 * | 6/2019 | Lu ....................... G06Q 20/4016 |

OTHER PUBLICATIONS

Authors et al.: Disclosed Anonymously IPCOM000229990D, Leveraging IP Reputation Data for Risk Based Access Management Publication Date: Aug. 12, 2013 (3 Pages).

Authors et al.: Disclosed Anonymously IPCOM000232278DE, Vulnerability Risk Context Scoring Scheme Publication Date: Oct. 30, 2013 ($ Pages).

Authors et al.: Disclosed Anonymously IPCOM000234138D, Method and System for Collecting and Managing Information for Secured Wifi Connection Publication Date: Jan. 14, 2014 (11 Pages ).

Developed in partnership with government authorities and industry stakeholders from the Asia-Pacific region. Australian Government, A Guide To Developing and Implementing a Suspicious Activity Identification Program At Ports (41 Pages).

* cited by examiner

DETECTING AND MITIGATING RISK IN A TRANSPORT NETWORK

BACKGROUND OF THE INVENTION

Field of the Invention

The present invention relates in general to computing systems, and more particularly to, various embodiments for implementing intelligent risk detection and mitigation in a transport network by a processor.

Description of the Related Art

In today's society, consumers, business persons, educators, and others use various computing network systems with increasing frequency in a variety of settings. The advent of computers and networking technologies have made possible the increase in the quality of life while enhancing day-to-day activities. Computing systems can include an Internet of Things (IoT), which is the interconnection of computing devices scattered across the globe using the existing Internet infrastructure. IoT devices may be embedded in a variety of physical devices or products. As great strides and advances in technologies come to fruition, these technological advances can be then brought to bear in everyday life and assist in improvements to quality of life and appropriate living conditions.

SUMMARY OF THE INVENTION

Various embodiments for implementing intelligent detection and mitigation of associated risks agents/entities in a transport network by one or more processors, are provided. In one embodiment, by way of example only, a method for implementing intelligent risk detection and mitigation in a transport network, again by a processor, is provided. Data may be gathered and analyzed from a plurality of data sources relating to an entity and a selected region of interest. Behavior of an entity, in relation to a risk event, may be learned and interpreted based on a plurality of identified contextual factors, geographical data, current data, historical data, a learned risk event model, or a combination thereof. One or more mitigation actions may be performed to mitigate risk of occurrence or a possible negative impact of the risk event caused at least in part by the behavior of the entity.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

Additionally, the Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Many of these objects are devices that are independently operable, but they may also be paired with a control system or alternatively a distributed control system such as one running over a cloud computing environment.

The prolific increase in use of IoT appliances in computing systems, particularly within the cloud computing environment, in a variety of settings provide various beneficial uses to a user. Various IoT appliances may be used for personal use, such as receiving critical news updates, alerts, or potential warnings relating to an event or condition that may compromise the health or safety. For example, an IoT device may be used to inform a user or vehicle of one or more risk agents in transport networks, in relation to sensitive geographic areas, and for mitigating the associated risks of the detected agents.

Thus, the present invention provides a cognitive system that may implement an intelligent risk detection and mitigation in a transport network having one or more processors. In one embodiment, by way of example only, data gathered from a plurality of data sources relating to one or more routes and destinations may be analyzed. Data may be gathered and analyzed from a plurality of data sources relating to an entity and a selected region of interest. Behavior of an entity, in relation to a risk event, may be learned and interpreted based on a plurality of identified contextual factors, geographical data, current data, historical data, a learned risk event model (which may be previously trained and learned using historical training data), or a combination thereof. One or more mitigation actions may be performed to mitigate risk of occurrence (e.g., a predicted chance of the risk occurring having a defined value exceeding a threshold or percentage) or a possible negative impact upon one or more alternative entities or structures of the risk event caused at least in part by the behavior of the entity.

In one aspect, the cognitive system may use as input 1) a map of an area of interest, 2) a knowledge of historical risk events (e.g., an event that may carry an attendant risk to one or more persons or property or compromise the security, safety, health, and/or physical/emotional welfare/well-being of one or more person/organizations), 3) risk event targets, 4) historical/real time data relating to one or more risk agent, which may be received from one or more sensors, cameras, IoT devices, and/or machine learning operations such as, for example, global positioning satellite ("GPS") data/measurements, one or more closed circuit television ("CCTV") cameras, 5) natural language processing (NLP) performed on the data, and/or 6) real-time data collection of the (e.g., GPS traces, CCTV-based location, etc.). In one aspect, a risk agent may be an entity, person, or organization that may engage in behavior that may create a risk event. That is, the risk agent may be an entity that is part of a transportation network, such as vehicles, pedestrians, cyclists, etc. The risk agent may be entity, person, or organization that may engage in an act or in a series of acts that may carry attendant risks to one or more persons or property. The risk agent may be entity, person, or organization that may create (or potentially create) a hazardous condition to one or more alternative persons and/or entities/organizations. The risk agent may also be an entity, person, or organization that may perform one or more actions that reduce the security, health, safety, and/or physical/emotional welfare/well-being of one or more persons, entities/organizations, or property or cause a negative impact of the health, safety, and/or physical/emotional welfare/well-being of one or more persons and/or entities/organizations.

In one aspect, the cognitive system may process and analyze the received input and generate/produce as output: 1) a list of risk agents, and/or 2) an identification of one or more risk events, one or more mitigating actions for an identified risk of the risk events.

In an additional aspect, the mechanisms of the illustrated embodiments may learn a sensitivity map from previous events such as, for example, learning 1) static maps (infrastructure data relative to vulnerable agents to risk events) that may include pedestrian areas, one or more areas that may have a level of risk greater than a defined threshold (e.g., a shopping center, public/government building/locations, public center, etc.), and/or 2) dynamic maps such as, for example, density maps of agent dynamics (which may be accesses/available via user equipment ("UE") (e.g., a smartphone, smart watch, etc.). Also, the cognitive system may detect and learn behavior of one or more risk agent from historical events, including mobility patterns, vehicle types (e.g., rented car, heavy-duty vehicles, motorcycles), etc.

The cognitive system may detect the behavior of one or more risk agents from one or more data sources in relation to sensitive data (e.g., sensitive geographic areas) based on one or more learned models (e.g., machine learning models related to the learned behavior). In one aspect, the sensitive data may be a combination of static and dynamic data that are prone or likely to have an occurrence of a risk event (e.g. the sensitivity map may be a map depicting he sensitivity data). The sensitive data may be learned from historical data. One or more mitigation actions may be identified such as, for example, communicating a signal to a computing device of a vehicle to terminate the engine of the vehicle (e.g., if the vehicle was rented car), providing one or more alerts/notifications to one or more users, emergency response personnel (e.g., a police officer), governmental agents via a UE.

As will be further described, the present invention provides one or more advantages and benefits of an intelligent risk detection and mitigation service system by integrating: (i) a large variety of data sources (e.g., traffic data); (ii) cognitive operations to predict user behavior using artificial intelligence (AI); (iii) analysis of the cognitive conditions of the user; (iv) a parsing engine that filters out the risks that are relevant to one or more selected areas of risk and/or risk agents; (v) context-aware operations to compute a risk measure associated with the one or more selected areas of risk and/or risk agents; (vi) a natural language processing (NLP) and interface that interacts and reasons with the user if and only if there is risk detected. For example, in one aspect, the variety of data sources may be analyzed by an NLP operation (e.g., text analysis) to data mine the relevant information from the content of the data sources in order to compute a risk measure associated with one or more selected areas of risk and/or risk agents. The NLP operation may be an instance of an NLP and artificial intelligence (AI) tools such as IBM® Watson® (IBM and Watson are trademarks of International Business Machines Corporation), which may be provided as a cloud service or as a local service.

Additional features and advantages of the risk detection and mitigation cognitive system include combining streams of data from various data sources such as, for example, from publicly and commercially available data sources (e.g., weather data, pollution alert data, governmental data sources, social media feeds, crime data/statistics, traffic data sources, traffic/parking regulations, etc.), information about the user from one or more IoT devices or sensors such as, for example, wearable devices or sensors, and/or from data available on-board a vehicle (e.g., proximity sensors, cameras, radio frequency identification "RFID" readers, biometric sensors, wearable sensors, driving history, charge/fuel state of car, etc.). The stream of data may be processed, and the real-time flux of information enables the generation of knowledge or knowledge domain/ontology (e.g., route choice, user fatigue) and enables the prediction of the journey and assessment of risks, using cloud computing and/or edge computing technology.

Also, as used herein, a vehicle may be an automobile, bicycle, hovercraft, scooter, bus, motorcycle, boat, ship, aircraft, plane, helicopter, drone, off road vehicle, truck, tractor, and/or other device used for movement or transportation. Also, sensors may include proximity sensors, cameras, radio frequency identification "RFID" readers, biometric sensors, wearable sensors, computers, handheld devices (e.g., Global Positioning System "GPS" device or step counters), smart phones, and/or other sensor based devices.

A knowledge domain or "ontology" may include, but not limited to, the knowledge domain or data repository of a collection of material, information, content and/or other resources related to a particular subject or subjects. For example the ontology may include, historical data relating to a user and/or vehicle, a user profile (e.g., calendar information, historical data relating to previous routes/destination data of the user, emotional/physical/mental condition of the user, preferences, priorities, biomedical data, psychophysical parameters of the user, medical history, emotional data, a drivers skills set, and the like), environmental data, traffic data, routes, roads, streets, highways, interstates, trails, bridges, maps, airports, and/or a variety of infrastructures relating to travel each having information relating to both size, length, a degree of complexity or difficulty of travel (e.g., travel navigation complexity), visibility, problems or issues relating to road work or repair, and/or traffic congestion. A machine learning mechanism may use feedback information to learn behavior of the user or vehicle, the plurality of events, and priorities and preferences of the user relating to the one or more routes and destinations, modes of transportation, and the one or more suggestions.

It should be noted that one or more calculations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
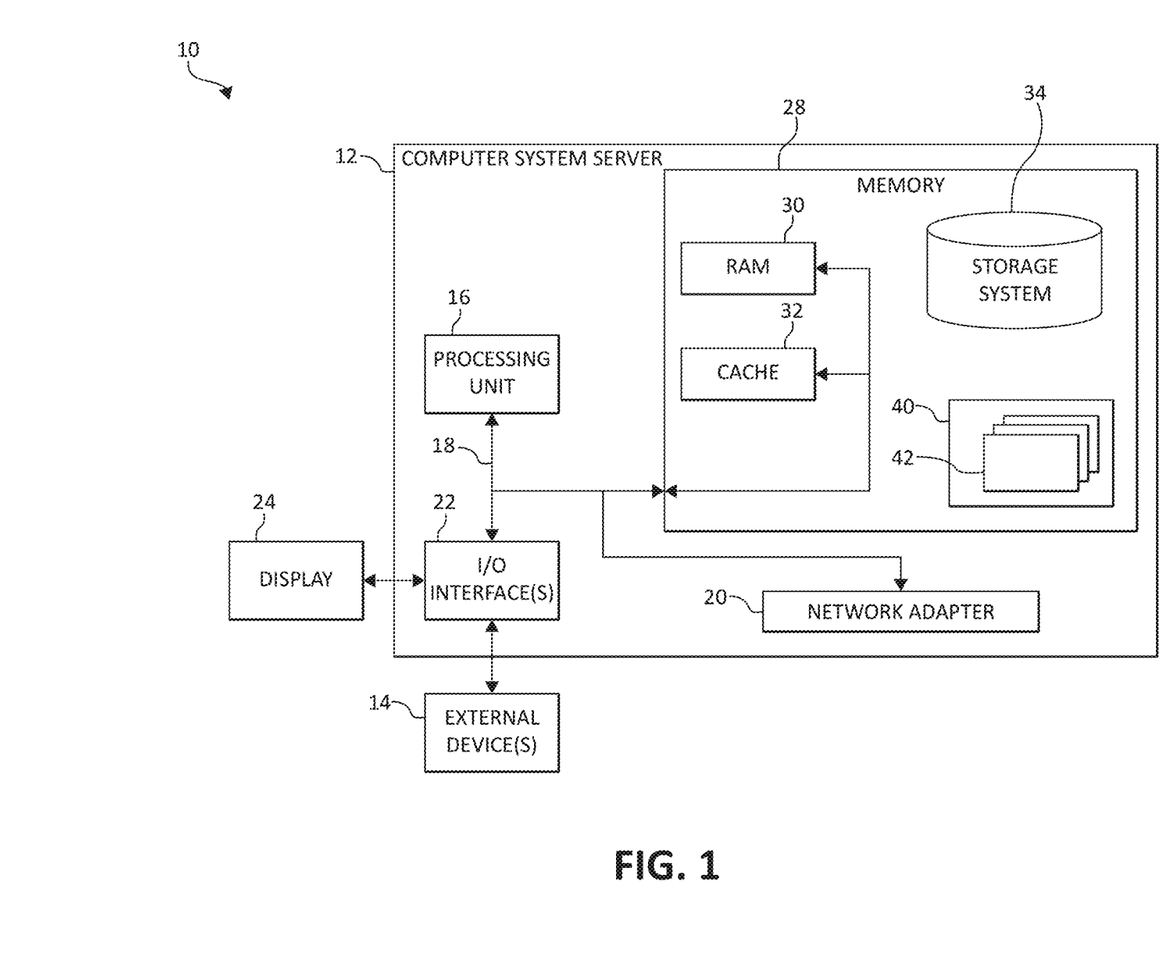
FIG. 1 is a block diagram depicting an exemplary computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
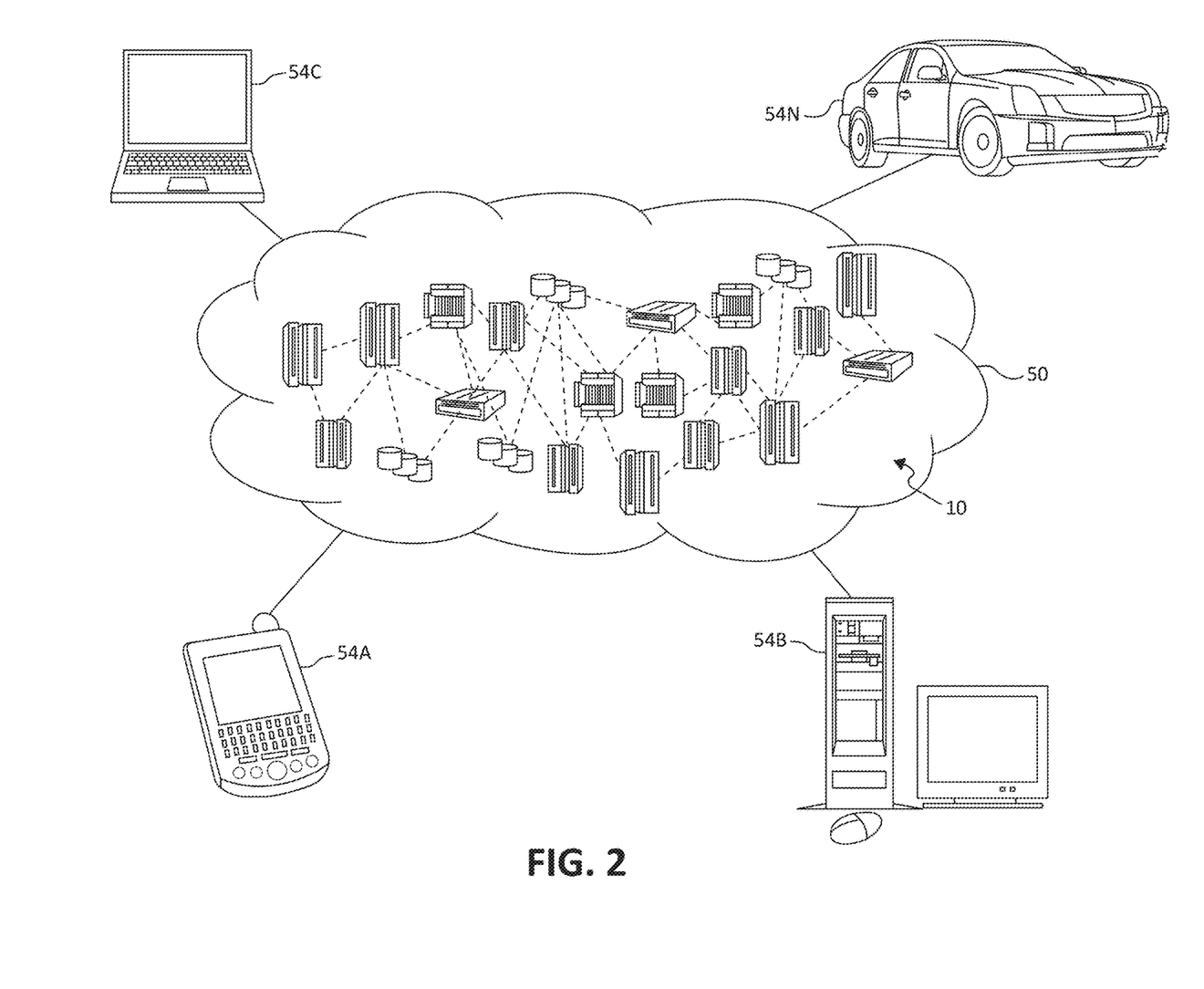
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
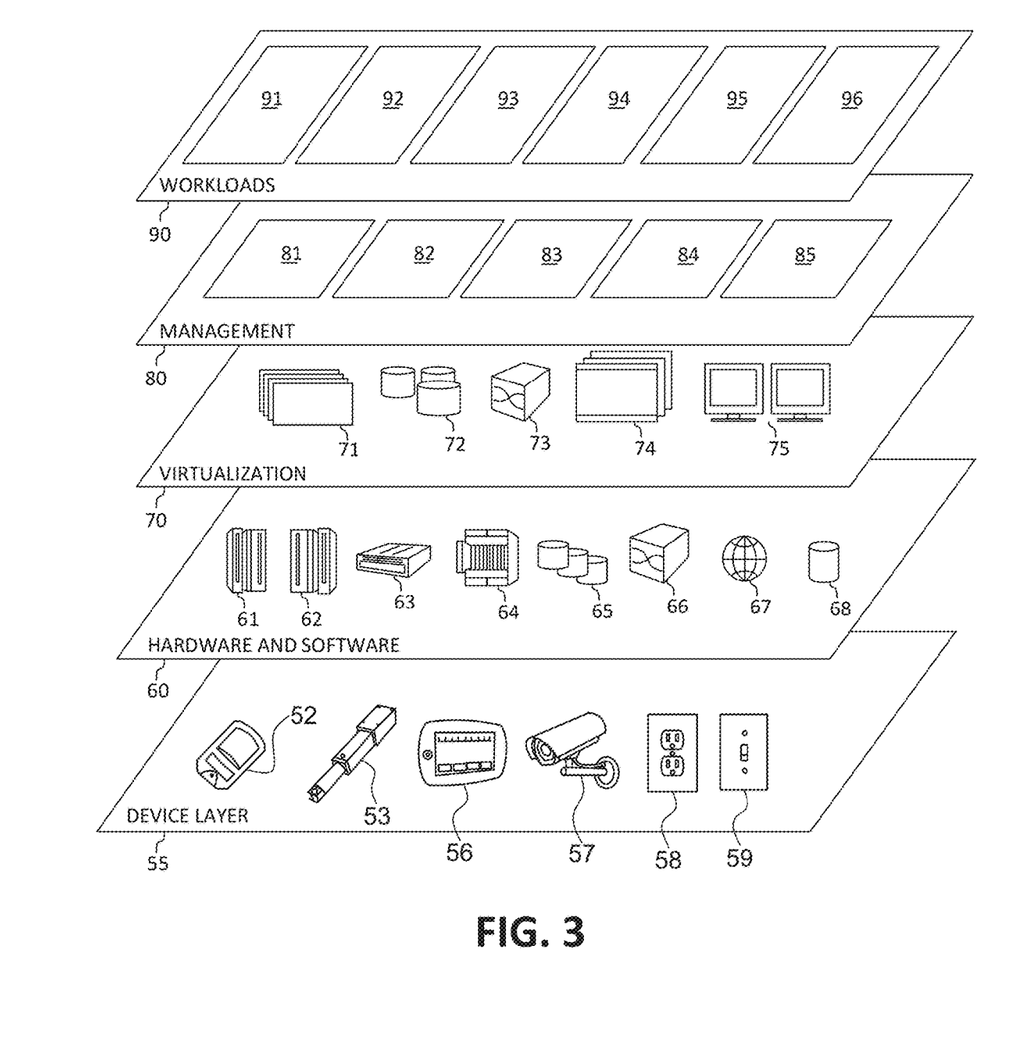
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various intelligent risk detection and mitigation workloads and functions 96. In addition, intelligent risk detection and mitigation workloads and functions 96 may include such operations as data analytics, data analysis, and as will be further described, notification functionality. One of ordinary skill in the art will appreciate that the intelligent risk detection and mitigation workloads and functions 96 may also work in conjunction with other portions of the various abstraction layers, such as those in hardware and software 60, virtualization 70, management 80, and other workloads 90 (such as data analytics processing 94, for example) to accomplish the various purposes of the illustrated embodiments of the present invention.

As previously mentioned, the present invention provides a cognitive system that implements an intelligent risk detection and mitigation in a transport network. Data gathered from a plurality of data sources relating to an entity and a selected region of interest. Behavior of an entity, in relation to a risk event, may be learned and interpreted based on a plurality of identified contextual factors, geographical data, current data, historical data, a learned risk event model, or a combination thereof. One or more mitigation actions may be performed to mitigate risk of occurrence or a possible negative impact of the risk event caused at least in part by the behavior of the entity. The risks may include various events having a negative impact upon safety, convenience, a duration of travel, level of enjoyment of the user or a vehicle associated with the user, or a combination thereof.

The events may include at least historical data relating to a user or vehicle, user behavior, one or more selected priorities of the user, actions of the user, calendar information associated with the user, information provided by one or more sensor devices or tags, biological data, biometric information surveyed from an occupant of a vehicle, physiological data, feedback information, social media information, weather, traffic conditions, environmental conditions, alerts, route conditions, events, accidents, news information, emergency data information, data obtained in real time from sensor based devices associated with the vehicle, detected vehicular faults or failures, devices or components of a vehicle being in an on position or off position, data relating to the vehicle, a plurality of vehicle factors, manufacturing information of the vehicle, a current position of the user or the vehicle, or a combination thereof.

Figure 4:
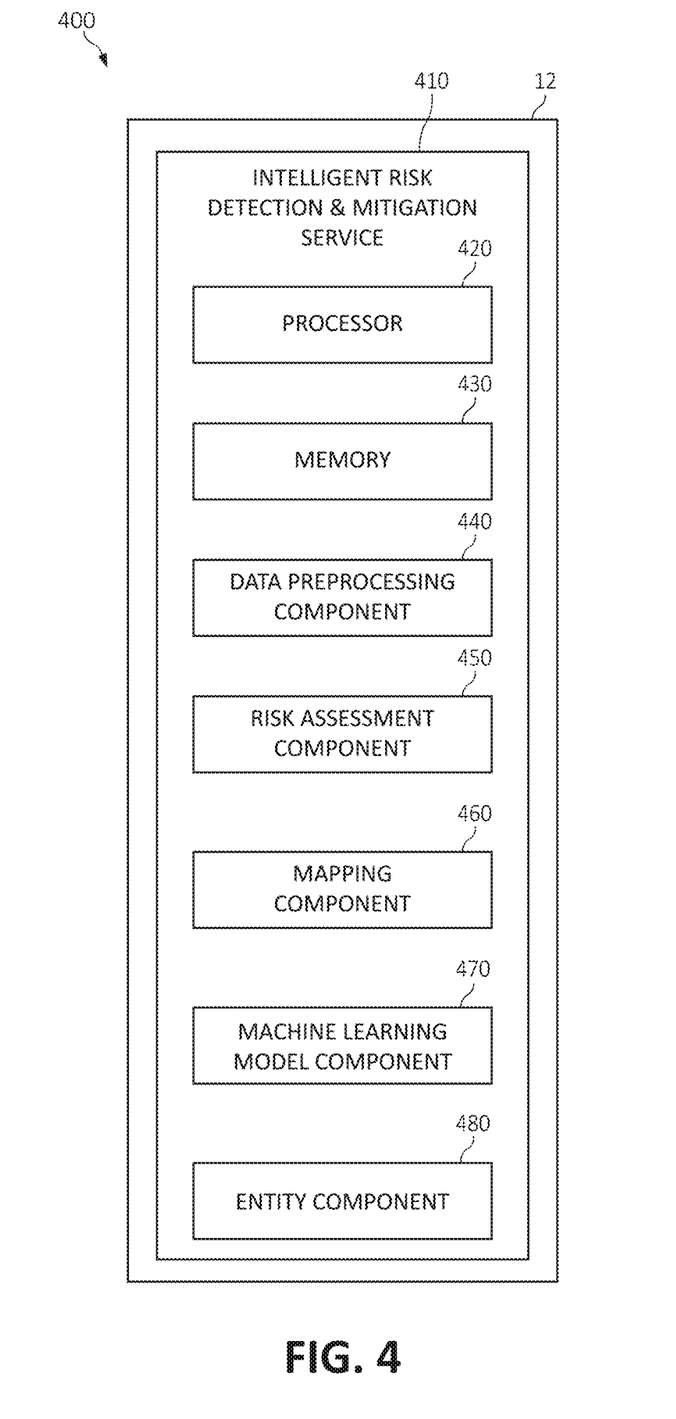
FIG. 4 is an additional block diagram depicting an exemplary functional relationship between various aspects of the present invention.

Turning now to FIG. 4, a block diagram depicting exemplary functional components 400 according to various mechanisms of the illustrated embodiments is shown. In one aspect, one or more of the components, modules, services, applications, and/or functions described in FIGS. 1-3 may be used in FIG. 4. An intelligent risk detection and mitigation service 410 is shown, incorporating processing unit ("processor") 420 to perform various computational, data processing and other functionality in accordance with various aspects of the present invention. The intelligent risk detection and mitigation service 410 may be provided by the computer system/server 12 of FIG. 1. The processing unit 420 may be in communication with memory 430. The intelligent risk detection and mitigation service 410 may include a data analysis component 440, a risk assessment component 450, a mapping component 460, a machine learning model component 470, and an entity component 480.

As one of ordinary skill in the art will appreciate, the depiction of the various functional units in intelligent risk detection and mitigation service 410 is for purposes of illustration, as the functional units may be located within the intelligent risk detection and mitigation service 410 or elsewhere within and/or between distributed computing components.

In one embodiment, by way of example only, the entity component 480, in association with the machine learning model component 470, may learn and interpret behavior of an entity in relation to a risk event based on a plurality of identified contextual factors, geographical data, current data, historical data, a learned risk event model, or a combination thereof. The data analyzing component 440 may analyze data gathered from a plurality of data sources relating to the behavior and a selected region.

The risk assessment and mitigation component 450 may perform one or more mitigation actions to mitigate risk of occurrence or a possible negative impact of the risk event caused at least in part by the behavior of the entity.

The mapping component 460 may identify one or more locations within a selected region having a level of risk of occurrence of the risk event greater than a defined risk threshold.

The risk assessment and mitigation component 450 may detect a level of risk of occurrence of the risk event in a selected region according to the behavior. The risk assessment and mitigation component 450 may alert one or more user equipment (UE) of a plurality of users upon the detected level of risk of being greater than a defined risk threshold.

The entity component 480 may provide a list of entities identified as having behavior having a level of risk of causing the risk event greater than a defined risk threshold.

The mapping component 460 may learn a sensitivity map from the plurality of identified contextual factors, the geographical data, the current data, the historical data, the learned risk event model, or a combination thereof.

A machine learning model component 470 may initialize a machine learning mechanism to 1) collect data gathered from one of a plurality of internet of things (IoT) devices and data sources relating to the behavior and a selected region, 2) learn and define a level of risk of occurrence of the risk event in the selected region according to the behavior based on analysis of the collected data, 3) use feedback information to learn behavior of the entity and one or more mitigating actions, and/or 4) monitor and determine a presence or absence of a risk of occurrence of the risk event for the selected region according to the behavior of the entity.

Additionally, machine learning model component 470 may learn and build a risk event model based on a plurality of identified contextual factors, geographical data, current data, historical data, previously learned risk event model, or a combination thereof. The risk event model may be used to learn and interpret behavior of an entity in relation to a risk event to trigger performance of one or more mitigation actions to mitigate risk of occurrence or a possible negative impact of the risk event caused at least in part by the behavior of the entity.

By way of example only, the machine learning model component 470 may determine one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural networks, Bayesian statistics, naive Bayes classifier, Bayesian network, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

In one aspect, machine learning model component 470 may include a domain knowledge and may be an ontology of concepts representing a domain of knowledge. A thesaurus or ontology may be used as the domain knowledge and may also be used to identify semantic relationships between observed and/or unobserved variables. In one aspect, the term "domain" is a term intended to have its ordinary meaning. In addition, the term "domain" may include an area of expertise for a system or a collection of material, information, content and/or other resources related to a particular subject or subjects. A domain can refer to information related to any particular subject matter or a combination of selected subjects.

The term ontology is also a term intended to have its ordinary meaning. In one aspect, the term ontology in its broadest sense may include anything that can be modeled as an ontology, including but not limited to, taxonomies, thesauri, vocabularies, and the like. For example, an ontology may include information or content relevant to a domain of interest or content of a particular class or concept. The ontology can be continuously updated with the information synchronized with the sources, adding information from the sources to the ontology as models, attributes of models, or associations between models within the ontology.

Figure 5:
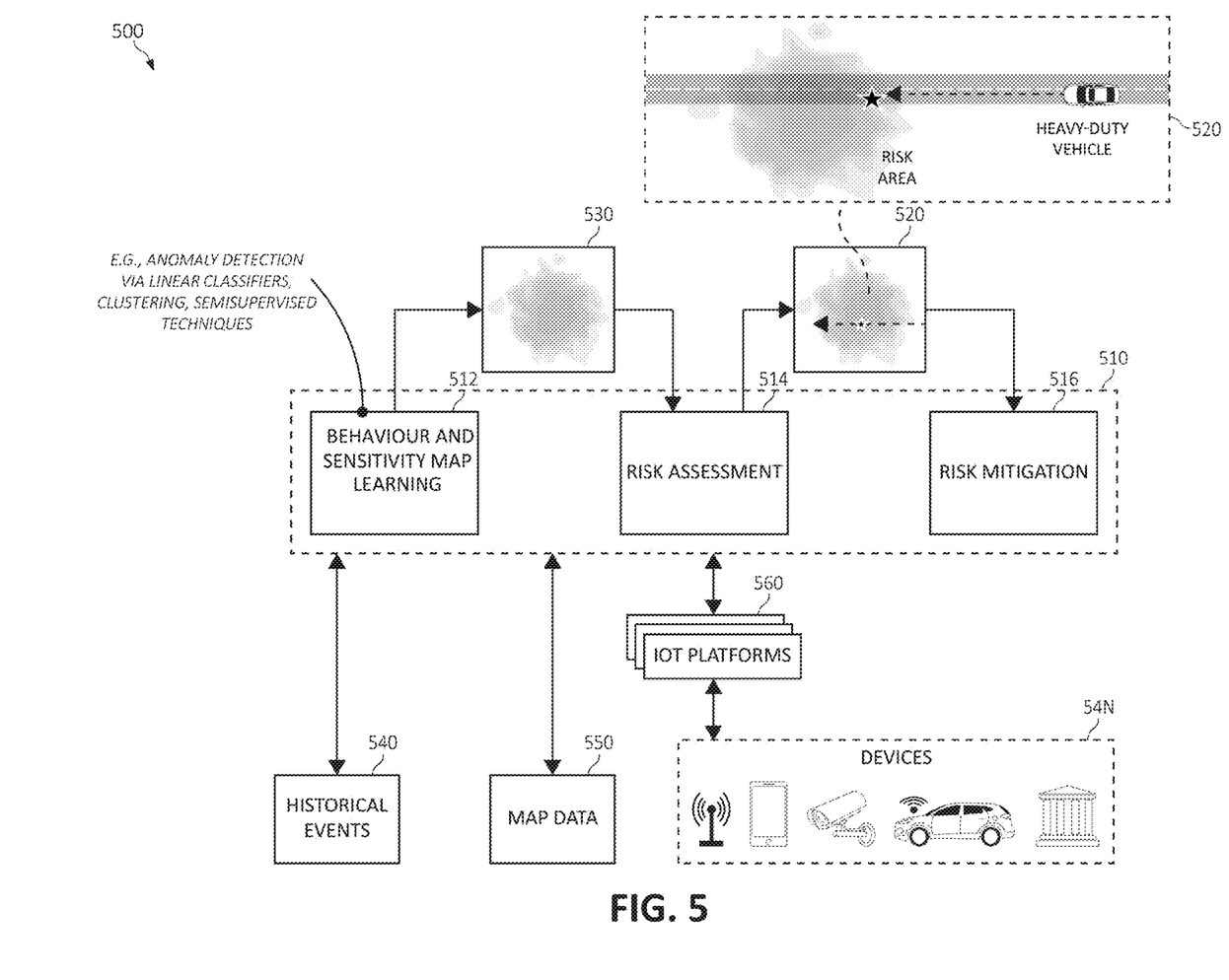
FIG. 5 is an additional block diagram depicting risk detection and mitigation in accordance with aspects of the present invention.

Turning now to FIG. 5, a block diagram of exemplary functionality 500 of an intelligent risk detection and mitigation service 510 in a transport/transportation network is depicted. It should be noted that the risk model may be included in and/or associated with computer system/server 12 of FIG. 1, incorporating one or more processing unit(s) 16 to perform various computational, data processing and other functionality in accordance with various aspects of the present invention. The components, modules, and/or functions described in FIG. 5 may include a browser, a proxy, a registry, and a server. In one aspect, the intelligent risk detection and mitigation service 510 may include a behavior (e.g., risk event behavior or suspicious behavior indicating engagement or propensity to engage in a risk event) and sensitivity map learning component 512, a risk assessment component 514, and a risk mitigation component 516.

The intelligent risk detection and mitigation service 510 may be associated with map data 550 and/or a knowledge domain 540, which may include historical data. The intelligent risk detection and mitigation service 510 may be in communication with one or more IoT computing systems (e.g., IoT platforms) 560, which may be in communication with one or more computing devices/IoT devices such as, for example, PDA or cellular telephone 54A, desktop computer 54B, laptop computer 54C, and/or automobile computer system 54N as described in FIG. 2.

Consider the following example of an implementation of the functionality of FIG. 5. A behavior and sensitivity map learning component 512 may identify one or more risk agent and one or more locations within a selected region 530 having a level of risk of occurrence of the risk event greater than a defined risk threshold from a plurality of data sources such as, for example, using historical events 540 and/or map data 550.

The behavior and sensitivity map learning component 512 may learn and detect the suspicious, risky, unsure/doubtful behavior may be based on linear classifiers, clustering, or semi-supervised techniques, and/or based on trajectory data. For example, the behavior and sensitivity map learning component 512 may use features such as, for example, speed/accelerometer data, trip occurrences around the selected region 530 (e.g., an identified sensitive area), and context (e.g., time of day, day of the week, etc.). The behavior and sensitivity map learning component 512 may learn and detect one or more sensitivity maps and may use a rule-based approaches or classification techniques. The behavior and sensitivity map learning component 512 may also use features such as, for example, popularity of a location/place, density of pedestrians, and/or political sensitivity (e.g., embassy, political building, etc.).

Using the data from the behavior and sensitivity map learning component 512 and the identified and selected region 530, the risk assessment 514 may detect a level of risk of occurrence of the risk event in the identified and selected region 530 according to the behavior, which may also include one or more routes and destinations in the selected region 530. The risk assessment component 514 may define the risk for the selected region 530 (which may also include one or more routes and destinations) based on a cognitive analysis of data gathered from a plurality of data sources such as, for example, using historical events 540 and/or map data 550, and/or determine a presence or absence of the risk for the selected region 530.

For example, the determined risks in relation to the one or more routes and destinations may include, for example, an event that may create a hazardous, dangerous, and/or fear-inducing actions or events that may negatively impact/influence and/or comprise the health, safety, and/or physical/emotional welfare/well-being of one or more persons and/or entities/organizations. In short, the risks may include information and risks relating to time, location, and/or risk probability. The risk assessment component 514, which may employ the use of a machine learning model may learn various risks based on the behavior one or more risk agents.

Upon assessing the level of risk of occurrence of the risk event, one or more mitigation actions to mitigate the risk may be determined by the risk mitigation 516. The risk mitigation 516 may determine one or more mitigating actions (e.g., suggestions) so as to mitigate or reduce the risk that may be caused by a risk agent, and also determine those of the mitigating actions that have less risk as compared to other mitigation actions.

For example, the one or more mitigating actions associated with one or more risks may include suggesting one or more terminating commute/travel plans to the selected region 530, using an alternative parking destination of the selected region 530. The one or more mitigating actions may also include, for example, suggestion to the user to change routes to the selected region 530. The minimizing actions may include alerting/communicating to emergency response agencies, governmental agencies, news networks, academic institutions, etc. In short, the one or more mitigating actions may include information and suggestions relating to time, location, alternative suggestions, and/or mitigation actions relating to the selected region 530, one or more risk agents, and/or a detected risk event relating to the selected region 530.

The risk mitigation 516 may use a machine learning model and may learn a risk agent's behavior and adapt the one or more mitigating actions to the learned behavior or propensities such as, for example, adapting the one or more mitigating actions. It should be noted that the one or more mitigating actions described herein are provided for illustration purposes only and are not to be interpreted as an exhaustive list. Accordingly, the one or more mitigating actions may include a variety of mitigating suggestions learned by machine learning, predefined, and/or cognitively learned based upon identified risks.

The intelligent risk detection and mitigation service 510 may communicate a list of the risk agent, the selected region 530 having a level of risk of occurrence of the risk event greater than a defined risk threshold, and/or the mitigation actions determined to eliminate, reduce, mitigate the risk in the selected region 530, and/or a combination to the one or more computing devices/IoT devices 54A-N via the IoT platforms 560.

Consider the following use case of an implementation of the aforementioned functionality where the intelligent risk detection and mitigation service 510 is included within a vehicle. Assume a vehicle is rented from a rental car agency (e.g., rented heavy-duty vehicle) and performing repetitive trips (reconnaissance) and/or driving at an unusually high speeds, close to an identified sensitive area (e.g., an unprotected area such as, for example, a park or shopping center that may be crowded with pedestrians). The intelligent risk detection and mitigation service 510 may access real-time GPS coordinates of the vehicle. The selected region 530 (e.g., an identified risk area) may be learned from one or more data sources (e.g., internet, news feed, one or more available IoT devices. The intelligent risk detection and mitigation service 510 may detect suspicious dynamics of the vehicle in relation to the identified sensitive area. The intelligent risk detection and mitigation service 510 may mitigate the detected risk by alerting the car-rental company to perform a safety check, deactivate, if available, engine of the vehicle, and/or issue an alert to one or more UE's of identified pedestrians in the selected region 530 (e.g., an identified risk area).

Figure 6:
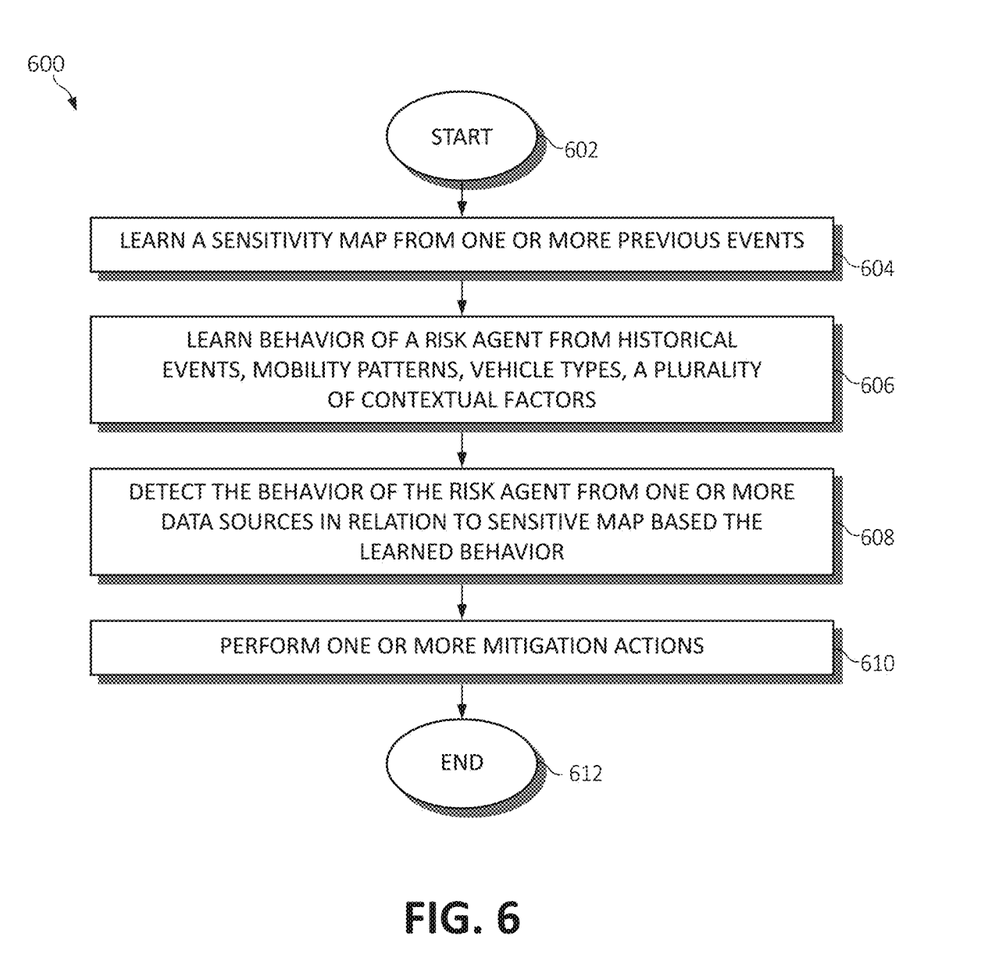
FIG. 6 is a flowchart diagram depicting an exemplary method for implementing intelligent risk detection and mitigation in a transport network by a processor, again in which aspects of the present invention may be realized.

Turning now to FIG. 6, a method 600 for implementing intelligent risk detection and mitigation in a transport network by a processor is depicted, in which various aspects of the illustrated embodiments may be implemented. The functionality 600 may be implemented as a method executed as instructions on a machine, where the instructions are included on at least one computer readable medium or one non-transitory machine-readable storage medium. The functionality 600 may start in block 602.

A sensitivity map may be learned from one or more previous events, as in block 604. Behavior of a risk agent may be learned from historical events, mobility patterns, vehicle types, a plurality of contextual factors, as in block 606. The behavior of the risk agent may be detected from one or more data sources in relation to sensitive map based the learned behavior, as in block 608. One or more mitigation actions may be performed, as in block 610. The functionality 600 may end, as in block 612.

Figure 7:
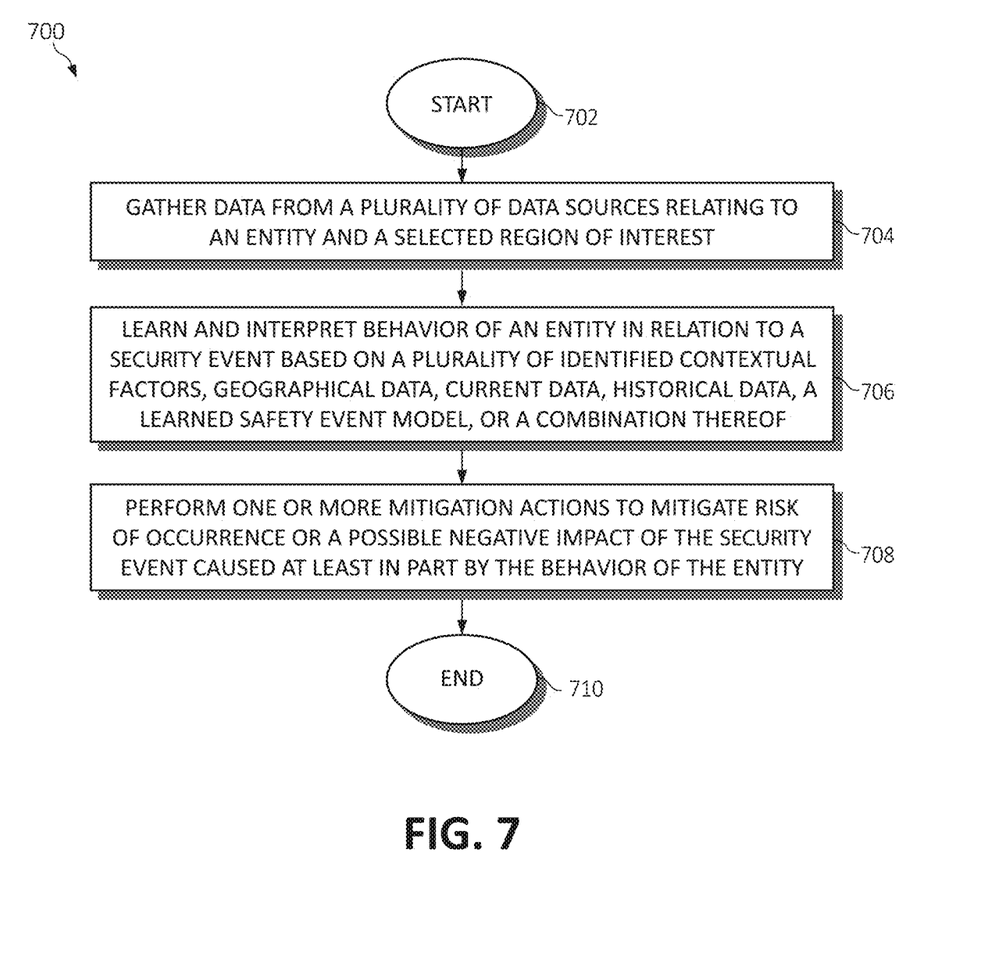
FIG. 7 is a flowchart diagram depicting an exemplary method for implementing intelligent risk detection and mitigation in a transport network by a processor, again in which aspects of the present invention may be realized.

Turning now to FIG. 7, a method 700 for implementing intelligent risk detection and mitigation in a transport network by a processor is depicted, in which various aspects of the illustrated embodiments may be implemented. The functionality 700 may be implemented as a method executed as instructions on a machine, where the instructions are included on at least one computer readable medium or one non-transitory machine-readable storage medium. The functionality 700 may start in block 702.

Data may be gathered from a plurality of data sources relating to an entity and a selected region of interest, as in block 704. Behavior of an entity, in relation to a risk event, may be learned and interpreted based on a plurality of identified contextual factors, geographical data, current data, historical data, a learned risk event model, or a combination thereof, as block 706. One or more mitigation actions may be performed to mitigate risk of occurrence or a possible negative impact of the risk event caused at least in part by the behavior of the entity, as in block 708. The functionality 700 may end, as in block 710.

In one aspect, in conjunction with and/or as part of at least one block of FIGS. 6 and 7, the operations of methods 600 and/or 700 may include each of the following. The operations of methods 600 and/or 700 may analyze data gathered from a plurality of data sources relating to the behavior and a selected region, and identify one or more locations within a selected region having a level of risk of occurrence of the risk event greater than a defined risk threshold.

The operations of methods 600 and/or 700 may detect a level of risk of occurrence of the risk event in a selected region according to the behavior, and/or alert one or more user equipment (UE) of a plurality of users upon the detected level of risk of being greater than a defined risk threshold.

The operations of methods 600 and/or 700 may provide a list of entities identified as having behavior having a level of risk of causing the risk event greater than a defined risk threshold, and/or learn a sensitivity map from the plurality of identified contextual factors, the geographical data, the current data, the historical data, the learned risk event model, or a combination thereof.

The operations of methods 600 and/or 700 may provide initialize a machine learning mechanism to collect data gathered from one of a plurality of internet of things (IoT) devices and data sources relating to the behavior and a selected region, learn and define a level of risk of occurrence of the risk event in the selected region according to the behavior based on analysis of the collected data, use feedback information to learn behavior of the entity and one or more mitigating actions, and/or monitor and determine a presence or absence of a risk of occurrence of the risk event for the selected region according to the behavior of the entity.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for implementing intelligent risk detection and mitigation in a transport network by a processor, comprising:
    learning and interpreting behavior of a vehicle in relation to a risk event indicative of bodily harm based on information representing a plurality of identified contextual factors, geographical data, current data, historical data, and a learned risk event model, wherein learning and interpreting the behavior includes identifying, based on the information inclusive of a trajectory and speed of the vehicle, that the vehicle is suspiciously traveling to one or more sensitive locations not permitting of vehicular traffic and known to attract a density of pedestrians within an identified risk area of a selected region based on at least user device data of the pedestrians within the identified risk area; and
    performing one or more mitigation actions to mitigate risk of occurrence or a possible negative impact of the risk event caused at least in part by the behavior of the vehicle, wherein the one or more mitigation actions include remotely disabling the vehicle by an entity external to the vehicle.

2. The method of claim 1, further including analyzing data gathered from a plurality of data sources relating to the behavior and the selected region.

3. The method of claim 1, further including identifying the one or more sensitive locations within the selected region having a level of risk of occurrence of the risk event greater than a defined risk threshold.

4. The method of claim 1, further including:
    detecting a level of risk of occurrence of the risk event in the selected region according to the behavior; or
    alerting one or more user equipment (UE) of a plurality of users upon the level of risk of occurrence of the risk event being greater than a defined risk threshold.

5. The method of claim 1, further including providing a list of entities identified as having behavior having a level of risk of causing the risk event greater than a defined risk threshold.

6. The method of claim 1, further including learning a sensitivity map from the plurality of identified contextual factors, the geographical data, the current data, the historical data, the learned risk event model, or a combination thereof.

7. The method of claim 1, further including initializing a machine learning mechanism to:
    collecting data gathered from one of a plurality of internet of things (IoT) devices and data sources relating to the behavior and the selected region;
    learning and defining a level of risk of occurrence of the risk event in the selected region according to the behavior based on analysis of the collected data;
    using feedback information to learn behavior of the vehicle and one or more mitigating actions;
    monitoring and determining a presence or absence of a risk of occurrence of the risk event for the selected region according to the behavior of the vehicle.

8. A system for implementing intelligent risk detection and mitigation in a transport network, comprising:
    a hardware processor;
    a hardware memory having executable instructions stored therein, wherein the executable instructions, when executed, cause the hardware processor to:
        learn and interpret behavior of a vehicle in relation to a risk event indicative of bodily harm based on information representing a plurality of identified contextual factors, geographical data, current data, historical data, and a learned risk event model, wherein learning and interpreting the behavior includes identifying, based on the information inclusive of a trajectory and speed of the vehicle, that the vehicle is suspiciously traveling to one or more sensitive locations not permitting of vehicular traffic and known to attract a density of pedestrians within an identified risk area of a selected region based on at least user device data of the pedestrians within the identified risk area; and
        perform one or more mitigation actions to mitigate risk of occurrence or a possible negative impact of the risk event caused at least in part by the behavior of the vehicle, wherein the one or more mitigation actions include remotely disabling the vehicle by an entity external to the vehicle.

9. The system of claim 8, wherein the executable instructions, when executed by the hardware processor, further cause the hardware processor to analyze data gathered from a plurality of data sources relating to the behavior and the selected region.

10. The system of claim 8, wherein the executable instructions, when executed by the hardware processor, further cause the hardware processor to identify the one or more sensitive locations within the selected region having a level of risk of occurrence of the risk event greater than a defined risk threshold.

11. The system of claim 8, wherein the executable instructions, when executed by the hardware processor, further cause the hardware processor to:
   detect a level of risk of occurrence of the risk event in the selected region according to the behavior; or
   alert one or more user equipment (UE) of a plurality of users upon the level of risk of occurrence of the risk event being greater than a defined risk threshold.

12. The system of claim 8, wherein the executable instructions, when executed by the hardware processor, further cause the hardware processor to provide a list of entities identified as having behavior having a level of risk of causing the risk event greater than a defined risk threshold.

13. The system of claim 8, wherein the executable instructions, when executed by the hardware processor, further cause the hardware processor to learn a sensitivity map from the plurality of identified contextual factors, the geographical data, the current data, the historical data, the learned risk event model, or a combination thereof.

14. The system of claim 8, wherein the executable instructions, when executed by the hardware processor, further cause the hardware processor to initialize a machine learning mechanism to:
   collect data gathered from one of a plurality of internet of things (IoT) devices and data sources relating to the behavior and the selected region;
   learn and define a level of risk of occurrence of the risk event in the selected region according to the behavior based on analysis of the collected data;
   use feedback information to learn behavior of the vehicle and one or more mitigating actions; and
   monitor and determine a presence or absence of a risk of occurrence of the risk event for the selected region according to the behavior of the vehicle.

15. A computer program product for, by a processor, implementing intelligent risk detection and mitigation in a transport network, the computer program product comprising a non-transitory computer-readable storage medium having computer-readable program code portions stored therein, the computer-readable program code portions comprising:
   an executable portion that learns and interprets behavior of a vehicle in relation to a risk event indicative of bodily harm based on information representing a plurality of identified contextual factors, geographical data, current data, historical data, and a learned risk event model, wherein learning and interpreting the behavior includes identifying, based on the information inclusive of a trajectory and speed of the vehicle, that the vehicle is suspiciously traveling to one or more sensitive locations not permitting of vehicular traffic and known to attract a density of pedestrians within an identified risk area of a selected region based on at least user device data of the pedestrians within the identified risk area; and
   an executable portion that performs one or more mitigation actions to mitigate risk of occurrence or a possible negative impact of the risk event caused at least in part by the behavior of the vehicle, wherein the one or more mitigation actions include remotely disabling the vehicle by an entity external to the vehicle.

16. The computer program product of claim 15, further including an executable portion that analyzes data gathered from a plurality of data sources relating to the behavior and the selected region.

17. The computer program product of claim 15, further including an executable portion that:
   identifies the one or more sensitive locations within the selected region having a level of risk of occurrence of the risk event greater than a defined risk threshold;
   detects the level of risk of occurrence of the risk event in the selected region according to the behavior; or
   alerts one or more user equipment (UE) of a plurality of users upon the level of risk of occurrence of the risk event being greater than a defined risk threshold.

18. The computer program product of claim 15, further including an executable portion that provides a list of entities identified as having behavior having a level of risk of causing the risk event greater than a defined risk threshold.

19. The computer program product of claim 15, further including an executable portion that learn a sensitivity map from the plurality of identified contextual factors, the geographical data, the current data, the historical data, the learned risk event model, or a combination thereof.

20. The computer program product of claim 15, further including an executable portion that initializes a machine learning mechanism to:
   collect data gathered from one of a plurality of internet of things (IoT) devices and data sources relating to the behavior and the selected region;
   learn and define a level of risk of occurrence of the risk event in the selected region according to the behavior based on analysis of the collected data;
   use feedback information to learn behavior of the vehicle and one or more mitigating actions; and
   monitor and determine a presence or absence of a risk of occurrence of the risk event for the selected region according to the behavior of the vehicle.

* * * * *